US012088980B2

(12) United States Patent
Bracciotti et al.

(10) Patent No.: US 12,088,980 B2
(45) Date of Patent: Sep. 10, 2024

(54) SOUND REPRODUCTION SYSTEM

(71) Applicant: POWERSOFT S.P.A., Scandicci (IT)

(72) Inventors: Leonardo Bracciotti, Montespertoli (IT); Claudio Lastrucci, Lastra a Signa (IT); Nicolò Zuccherini Martello, Castiglione del Lago (IT)

(73) Assignee: POWERSOFT S.P.A., Scandicci (IT)

(*) Notice: Subject to any disclaimer, the term of this patent is extended or adjusted under 35 U.S.C. 154(b) by 256 days.

(21) Appl. No.: 17/667,677

(22) Filed: Feb. 9, 2022

(65) Prior Publication Data

US 2022/0264206 A1 Aug. 18, 2022

(30) Foreign Application Priority Data

Feb. 12, 2021 (IT) ........................ 102021000003173

(51) Int. Cl.
*H04R 1/02* (2006.01)
*H04R 1/28* (2006.01)
*H04R 1/32* (2006.01)
*H04R 3/12* (2006.01)

(52) U.S. Cl.
CPC ............. *H04R 1/025* (2013.01); *H04R 1/026* (2013.01); *H04R 1/2834* (2013.01); *H04R 1/323* (2013.01); *H04R 3/12* (2013.01); *H04R 2201/025* (2013.01); *H04R 2201/401* (2013.01)

(58) Field of Classification Search
CPC .......... H04R 1/02; H04R 1/025; H04R 1/026; H04R 1/2834; H04R 1/283; H04R 1/2807; H04R 1/32; H04R 1/323; H04R 3/12; H04R 2201/025; H04R 2201/401
See application file for complete search history.

(56) References Cited

U.S. PATENT DOCUMENTS 3,071,728 A * 1/1963 Grace .................... H05K 11/02 248/314
4,234,766 A * 11/1980 Cacho ...................... H04R 1/06 181/171
4,392,548 A * 7/1983 Bailey ...................... H04R 5/02 181/155
(Continued)

OTHER PUBLICATIONS

European Search Report issued in European Application No. 22155354 dated Jul. 1, 2022.
(Continued)

*Primary Examiner* — Edgardo San Martin
(74) *Attorney, Agent, or Firm* — United IP Counselors, LLC

(57) ABSTRACT

A sound reproduction system (10) comprises a supporting structure (2) that includes a distribution circuit (23); a loudspeaker box (1) that is removably connected to the supporting structure (2) and includes a cabinet (11) and a sound transducer (12) associated with the cabinet (11); a connection circuit (13), which is connected electrically to the distribution circuit (23) of the supporting structure (2) and is configured to receive a signal from the distribution circuit (23) and to transmit it to the sound transducer (12), the connection circuit (13) of the loudspeaker box (1) being connectable to the distribution circuit (23) of the supporting structure (2) at a plurality of angular positions, rotated relative to each other about the longitudinal axis (A).

20 Claims, 10 Drawing Sheets

(56) References Cited

U.S. PATENT DOCUMENTS

| | | | | | |
|---|---|---|---|---|---|
| 4,475,226 | A * | 10/1984 | Greenberg | H04R 3/12 | 362/370 |
| 4,752,962 | A * | 6/1988 | Thiele | H04R 1/025 | 439/845 |
| 4,757,544 | A | 7/1988 | Guy | | |
| 4,776,018 | A * | 10/1988 | Cordier | H04B 1/08 | 381/390 |
| 4,953,223 | A * | 8/1990 | Householder | H04R 1/26 | 381/387 |
| 4,963,854 | A * | 10/1990 | Stuecker | G10K 11/004 | 381/387 |
| 5,048,089 | A * | 9/1991 | Moore | H04R 1/025 | 381/387 |
| 5,303,422 | A * | 4/1994 | Tsukuda | H04B 1/082 | 381/86 |
| 5,828,765 | A * | 10/1998 | Gable | H04R 1/028 | 181/150 |
| 6,374,942 | B1 | 4/2002 | Huggins | | |
| 6,748,096 | B2 * | 6/2004 | Chuang | H04R 1/026 | 181/150 |
| 9,462,361 | B2 * | 10/2016 | Amae | H04R 31/006 | |
| 10,312,651 | B2 * | 6/2019 | Lai | H01R 33/94 | |
| 2002/0027613 | A1 * | 3/2002 | Tajima | G06F 1/1605 | 348/E5.13 |
| 2008/0123894 | A1 | 5/2008 | Lu | | |
| 2012/0039476 | A1 | 2/2012 | Cha | | |
| 2016/0080845 | A1 * | 3/2016 | Williams | H04R 1/28 | 381/386 |
| 2019/0182600 | A1 * | 6/2019 | Liu | H04R 9/06 | |

OTHER PUBLICATIONS

Search Report issued in Italian Patent Application No. 202100003173 dated Nov. 4, 2021.

Written Opinion issued in Italian Patent Application No. 202100003173 dated Nov. 4, 2021.

* cited by examiner

SOUND REPRODUCTION SYSTEM

TECHNICAL FIELD

The present invention relates to a sound reproduction system, a loudspeaker box and a method for connecting a loudspeaker box to a supporting structure.

The field of the invention is that of sound reproduction systems and, more specifically, loudspeaker boxes.

BACKGROUND

In this field, patent document U.S. Pat. No. 6,374,942B1 discloses a system for mechanically and electrically connecting a loudspeaker box to a supporting structure where the loudspeaker box and the supporting structure are electrically coupled to each other in such a way as to allow full rotation of the loudspeaker box in relation to the supporting structure. The system comprises a first shell that is fixed to the supporting structure and a second shell that is fixed to the loudspeaker box, the two shells being configured to be interconnected; the shells make the structure considerably complex and occupy a relatively large amount of space. Moreover, the electrical connection is made by connectors that are not very reliable and have a tendency to be disconnected.

Other examples of loudspeakers are provided in patent documents US2008/123894A1 and U.S. Pat. No. 4,757,544A. These loudspeakers may be adjusted in their position once they are connected to another loudspeaker. However, these documents do not fulfil the need for an improved system for mechanically and electrically connecting a loudspeaker box to a supporting structure where the loudspeaker box and the supporting structure.

BRIEF SUMMARY

The aim of this disclosure is to provide a sound reproduction system, a loudspeaker box (i.e. a loudspeaker) and a method for connecting a loudspeaker box to a supporting structure to overcome at least one of the above mentioned disadvantages of the prior art.

This aim is fully achieved by the sound reproduction system, the loudspeaker box and the method of this disclosure as characterized in the appended claims.

According to one aspect of it, this disclosure relates to a sound reproduction system. The sound reproduction system comprises a supporting structure. The supporting structure is a stationary, fixed structure. The supporting structure includes a supporting wall, developing in a supporting plane. The supporting structure includes a distribution circuit. Preferably, the distribution circuit develops in the supporting plane. The sound reproduction system comprises a loudspeaker box, or at least one loudspeaker box. The loudspeaker box is removably connected to the supporting structure. More specifically, the loudspeaker box is mechanically and electrically connected to the supporting structure in such a way that it can be removed.

The loudspeaker box includes a sound transducer, associated with the cabinet. In an example embodiment, the sound transducer may comprise a vibrating membrane (alternatively, it might include a piezoelectric material or other systems of essentially known type in the field of sound reproduction systems). The sound transducer includes an electric motor configured to set the membrane vibrating.

The loudspeaker box includes a cabinet. The cabinet is configured to enclose an air space around the sound transducer. This air space is functional to sound performance. In an embodiment, the cabinet is (or is associated with) the loudspeaker box. In this embodiment, the cabinet extends around a longitudinal axis. In another embodiment, the cabinet is associated with a plurality of loudspeaker boxes.

The loudspeaker box is mechanically connected to the supporting structure. More specifically, in an embodiment, the cabinet is mechanically connected to the supporting structure, or is mounted on the supporting structure.

The loudspeaker box includes a connection circuit, which is operatively electrically connected to the distribution circuit of the supporting structure and is configured to receive a signal from the distribution circuit and to transmit it to the sound transducer (or to the motor) to make the vibrating membrane vibrate. Preferably, the connection circuit is also configured to receive an electrical power supply from the distribution circuit of the supporting structure and to transmit it to the sound transducer (or to the motor). There might be an Ethernet connection to carry both the electrical power supply and the signal, or there might be a dedicated connection for the signal and another dedicated connection for the electrical power supply.

In the loudspeaker box, the sound transducer and the connection circuit are positioned at opposite ends of the self-same loudspeaker box, with respect to a longitudinal axis. The sound transducer and the connection circuit form an operating structure of the loudspeaker box. The operating structure of the loudspeaker box has a rotational symmetry with respect to the longitudinal axis.

About the cabinet, the present disclosure provides two embodiments. In one embodiment, the (each) loudspeaker box is provided with a dedicated (respective) cabinet; in this case, the cabinet is preferably part of the operating structure of the loudspeaker box, which exhibits a rotational symmetry with respect to the longitudinal axis. In an alternative embodiment, a plurality of loudspeaker boxes shares one same cabinet; in this case, the cabinet does not form part of the operating structure of the loudspeaker box which exhibits the rotational symmetry with respect to the longitudinal axis.

The connection circuit of the loudspeaker box is connectable (that is, it is configured for being operatively connected) to the distribution circuit of the supporting structure at a plurality of angular positions, rotated in relation to each other around the longitudinal axis. In a preferred embodiment, the connection circuit of the loudspeaker box and the distribution circuit of the supporting structure are configured to maintain electrical continuity during a rotation (preferably complete) of the loudspeaker box relative to the supporting structure about the longitudinal axis. By complete rotation is meant a rotation through 360°, hence through an infinite plurality of angular positions.

Therefore, the loudspeaker box can be rotated around the longitudinal axis among a plurality of angular positions, while the sound transducer and the connection circuit (thus the operating structure) of the loudspeaker box remain oriented along the longitudinal axis. In the embodiment wherein the cabinet is part of the operating structure of the loudspeaker box, the cabinet rotates as one with the loudspeaker box; instead, in the embodiment where the cabinet is common to a plurality of loudspeaker boxes, the cabinet remains stationary during the rotation of the loudspeaker box.

At least one between the distribution circuit of the supporting structure and the connection circuit of the loudspeaker box includes a first conductive track and a second conductive track, which extend perpendicularly to the longitudinal axis and are distributed along respective concentric annular paths around the longitudinal axis. More specifically, the second conductive track extends around the longitudinal axis internally relative to the first conductive track.

The provision of the first and second conductive tracks running all the way around the longitudinal axis and oriented in a plane perpendicular to the longitudinal axis (or in two or more planes perpendicular to the longitudinal axis) makes the electrical connection independent of the relative angular position of the loudspeaker box in relation to the supporting structure and is, at the same time, a practical, simple and reliable system.

In other words, the loudspeaker box may be movable relative to the supporting structure between a connected configuration and a disconnected configuration. In the disconnected configuration, the loudspeaker box may be positioned at a plurality of angular positions which are rotated angularly relative to each other about the longitudinal axis and where there is electrical continuity.

More specifically, in an embodiment, the connection circuit may include the first and the second conductive track and the distribution circuit may include connectors which are operatively connected to the first and the second conductive track. Conversely, in another embodiment, the distribution circuit may include the first and the second conductive track and the connection circuit may include connectors which are operatively connected to the first and the second conductive track. In another embodiment, both the distribution circuit and the connection circuit may include a respective first conductive track and a respective second conductive track, and the loudspeaker box may include connectors which are interconnected between the conductive tracks of the distribution circuit and the conductive tracks of the connection circuit; more specifically, in this embodiment, at least a first connector (or a first pair of connectors) that is interconnected between the first conductive track of the distribution circuit and the first conductive track of the connection circuit and a second connector (or a second pair of connectors) that is interconnected between the second conductive track of the distribution circuit and the second conductive track of the connection circuit.

The sound reproduction system comprises a mechanical connector, where the cabinet is mechanically connected to the supporting structure removably by the mechanical connector. Preferably, the mechanical connector is positioned internally in relation to the first conductive track and the second conductive track.

Preferably, the mechanical connector is threaded. Hence, the loudspeaker box (more specifically, the operating structure of the loudspeaker box) can be mechanically coupled to the supporting structure by rotating the loudspeaker box (more specifically, the operating structure of the loudspeaker box) about the longitudinal axis. In this way, the same rotating movement of the (the operating structure of the) loudspeaker box allows both mechanical and electrical connection of the loudspeaker box to the supporting structure. The final angular position of the loudspeaker box with respect to the supporting structure may depend on the respective threads and on the screwing force applied and thus may not be known a priori, but this does not affect the correct electrical connection between the loudspeaker box to the supporting structure and does not change the orientation of the loudspeaker box (because the sound transducer is always oriented in the longitudinal axis).

More specifically, in an embodiment, the mechanical connector is a stud bolt fastened to the supporting structure and extending along the longitudinal axis, and the loudspeaker box includes a removable female screw connected to the stud bolt. In a further embodiment, the mechanical connector is a stud bolt fastened to the loudspeaker box and the supporting structure includes a removable female screw connected to the stud bolt.

In an embodiment, the mechanical connector might include an adhesive material that joins the cabinet to the supporting structure. The adhesive material might be positioned internally and/or externally in relation to the first and the second conductive track.

Preferably, the sound reproduction system comprises a plurality of electrical connectors; the connection circuit of the loudspeaker box is electrically connected to the distribution circuit of the supporting structure through the electrical connectors. More specifically, in an embodiment, the electrical connectors are deformable electrical connectors (for example, sliding contact connectors that is a slip ring connectors).

Still more specifically, the first and the second conductive track are provided in the connection circuit of the loudspeaker box and the distribution circuit includes a further first conductive track and a further second conductive track, which extend perpendicularly to the longitudinal axis and are distributed along respective concentric annular tracks around the longitudinal axis. The plurality of deformable electrical connectors includes at least a first deformable electrical connector (or a first pair of deformable electrical connectors) that connects the first conductive track of the connection circuit to the further first conductive track of the distribution circuit, and a second deformable electrical connector (or a second pair of deformable electrical connectors) that connects the second conductive track of the loudspeaker box to the further second conductive track of the distribution circuit of the supporting structure.

In a preferred embodiment, the first conductive track and the second conductive track are shaped like uninterrupted concentric rings surrounding the longitudinal axis. In this case, therefore, the connection circuit and the distribution circuit are shaped in such a way as to maintain electrical continuity during a complete rotation of the loudspeaker box relative to the supporting structure about the longitudinal axis.

In other embodiments, the first and/or the second conductive track, although they extend along annular tracks around the longitudinal axis, may have breaks in them; in this case, there are nevertheless a plurality of relative angular positions of the loudspeaker box in relation to the supporting structure, where electrical connection is made, but these angular positions are not infinite, that is to say, they do not cover a 360° rotation.

The cabinet encloses an internal space which is subject to pressure variations caused by vibration of the sound transducer. Thus, the loudspeaker box is self-consistent: it can work even if it is not integrated in the sound reproduction system.

In an embodiment, the loudspeaker box comprises one or more passive resonators, including respective membranes that are made to vibrate by the pressure variations of the internal space. Thus, while the active resonators are moved actively by the motor, the passive resonators are moved by the vibration of the air in the internal space. The passive resonators allow extending the low frequency response.

Preferably, the sound reproduction system comprises a plurality of loudspeaker boxes which are removably connected to the supporting structure. Each loudspeaker box of the plurality of loudspeaker boxes has one or more of the features described herein in connection with the loudspeaker box. The supporting structure includes a plurality of distribution circuits. More specifically, each loudspeaker box of the plurality of loudspeaker boxes includes a respective connection circuit that is electrically connected to a respective distribution circuit of the plurality of distribution circuits.

It should be noted that the sound reproduction system according to this disclosure has the advantage of allowing a loudspeaker box to be replaced quickly and easily in the event of a fault, without having to also remove the other loudspeaker boxes of the sound reproduction system. Moreover, the electrical connection is particularly reliable.

In an embodiment, the loudspeaker box includes an electronic printed circuit configured to carry the signal to the plurality of distribution circuits.

In an embodiment, the supporting structure includes a frame. The loudspeaker box, or the plurality of loudspeaker boxes, is mounted on the frame. The distribution circuit, or each distribution circuit of the plurality of distribution circuits, includes a plate; the plate is configured to receive the signal and to transmit it to the connection circuit of a respective loudspeaker box. The frame is interposed between the loudspeaker box, or each loudspeaker box of the plurality of loudspeaker boxes, and the respective plate. Both the plate and the loudspeaker box are mechanically supported by the frame.

More specifically, the sound reproduction system comprises, for the loudspeaker box, or for each loudspeaker box of the plurality of loudspeaker boxes, a respective plurality of electrical connectors; the frame defines a plurality of holes in which the electrical connectors of the plurality of electrical connectors are inserted in order to connect the connection circuit of the loudspeaker box to the respective plate. In this embodiment, the electrical connectors are preferably rigid, that is to say, not deformable.

This disclosure also provides a loudspeaker box; the loudspeaker box is connectable to the supporting structure and is made according to one or more aspects of this disclosure. Thus, the loudspeaker box is configured to be installed in a sound reproduction system according to one or more aspects of this disclosure.

This disclosure also provides a method for connecting a loudspeaker box to a supporting structure. The supporting structure includes a distribution circuit. The loudspeaker box includes: a cabinet which extends around a longitudinal axis; a sound transducer, associated with the cabinet and comprising a vibrating membrane; a connection circuit.

The method comprises a step of mounting (that is, mechanically connecting) the loudspeaker box to the supporting structure. More specifically, in an embodiment, the cabinet is removably connected to the supporting structure. The method comprises a step of electrically connecting the connection circuit of the loudspeaker box to the distribution circuit of the supporting structure in such a way that the connection circuit can receive a signal from the distribution circuit and transmit it to the sound transducer to cause the vibrating membrane to vibrate. The connection circuit of the loudspeaker box is connectable to the distribution circuit of the supporting structure at a plurality of different angular positions, rotated in relation to each other around the longitudinal axis. At least one between the distribution circuit of the supporting structure and the connection circuit of the loudspeaker box includes a first conductive track and a second conductive track, which extend perpendicularly to the longitudinal axis and are distributed along respective concentric annular paths around the longitudinal axis.

In an embodiment, the steps of mounting the cabinet on the supporting structure and electrically connecting the connection circuit of the loudspeaker box to the distribution circuit of the supporting structure are carried out through a movement of the loudspeaker box towards the supporting structure along the longitudinal axis. More specifically, the steps of mounting the cabinet on the supporting structure and electrically connecting the connection circuit of the loudspeaker box to the distribution circuit of the supporting structure may be carried out simultaneously through said movement of the loudspeaker box towards the supporting structure. In an embodiment, the steps of mounting the cabinet on the supporting structure and electrically connecting the connection circuit of the loudspeaker box also include rotating the loudspeaker box relative to the supporting structure.

It should be noted that to make a sound reproduction system, the method for connecting the loudspeaker box to the supporting structure is repeated for each loudspeaker box of the plurality of loudspeaker boxes making up the system. More specifically, the supporting structure includes a plurality of distribution circuits and each loudspeaker box is connected to a respective distribution circuit of the plurality.

BRIEF DESCRIPTION OF THE DRAWING FIGURES

These and other features will become more apparent from the following description of a preferred embodiment, illustrated by way of non-limiting example in the accompanying drawings, in which.

DETAILED DESCRIPTION

Figure 1:
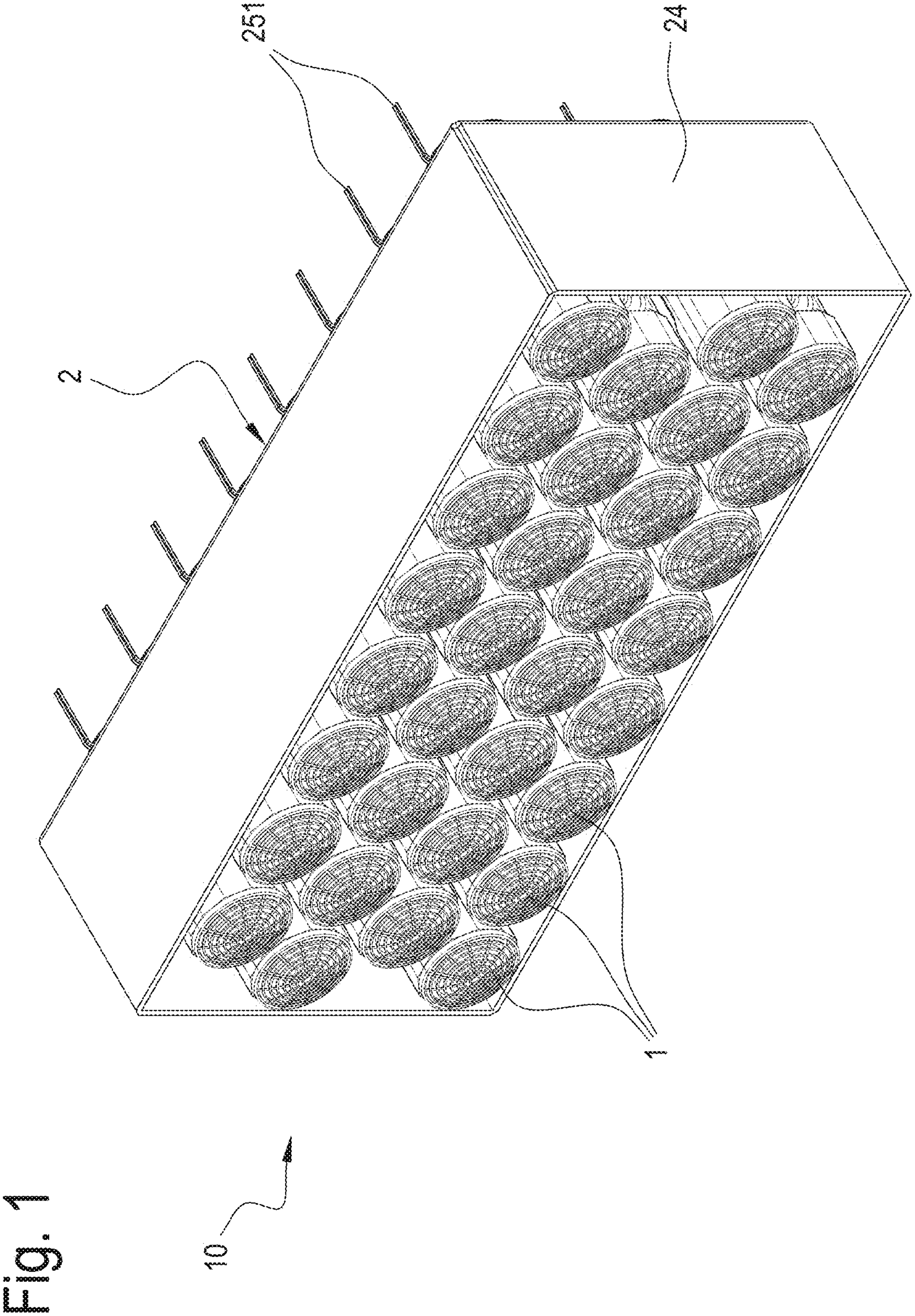
FIG. 1 shows a side perspective view of a sound reproduction system according to this disclosure.
Figure 2A:
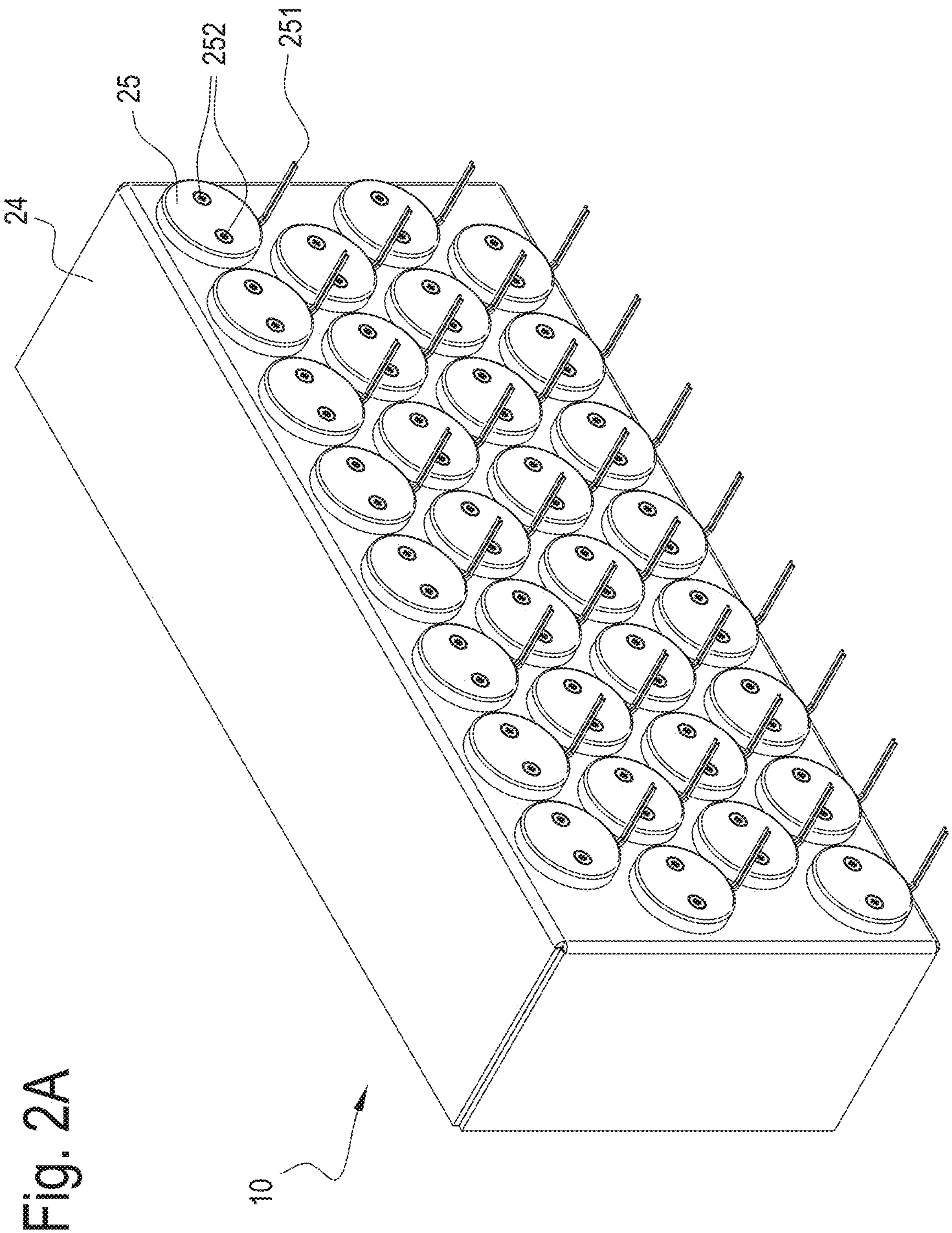
FIG. 2A shows the sound reproduction system of FIG. 1 in a perspective view from behind.
Figure 2B:
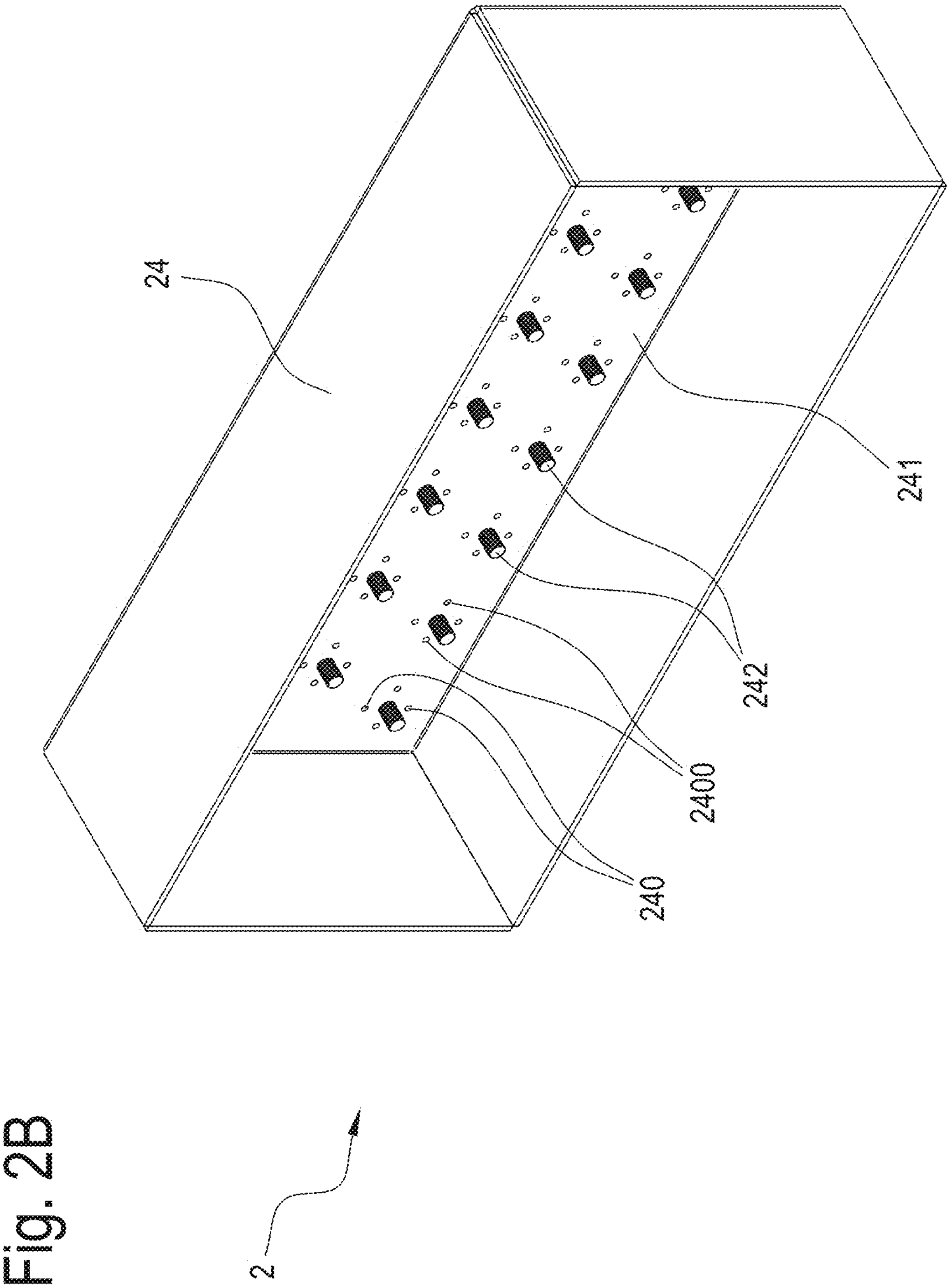
FIG. 2B shows a frame of the supporting structure of the sound reproduction system of FIG. 1, with the loudspeaker boxes removed.
Figure 3:
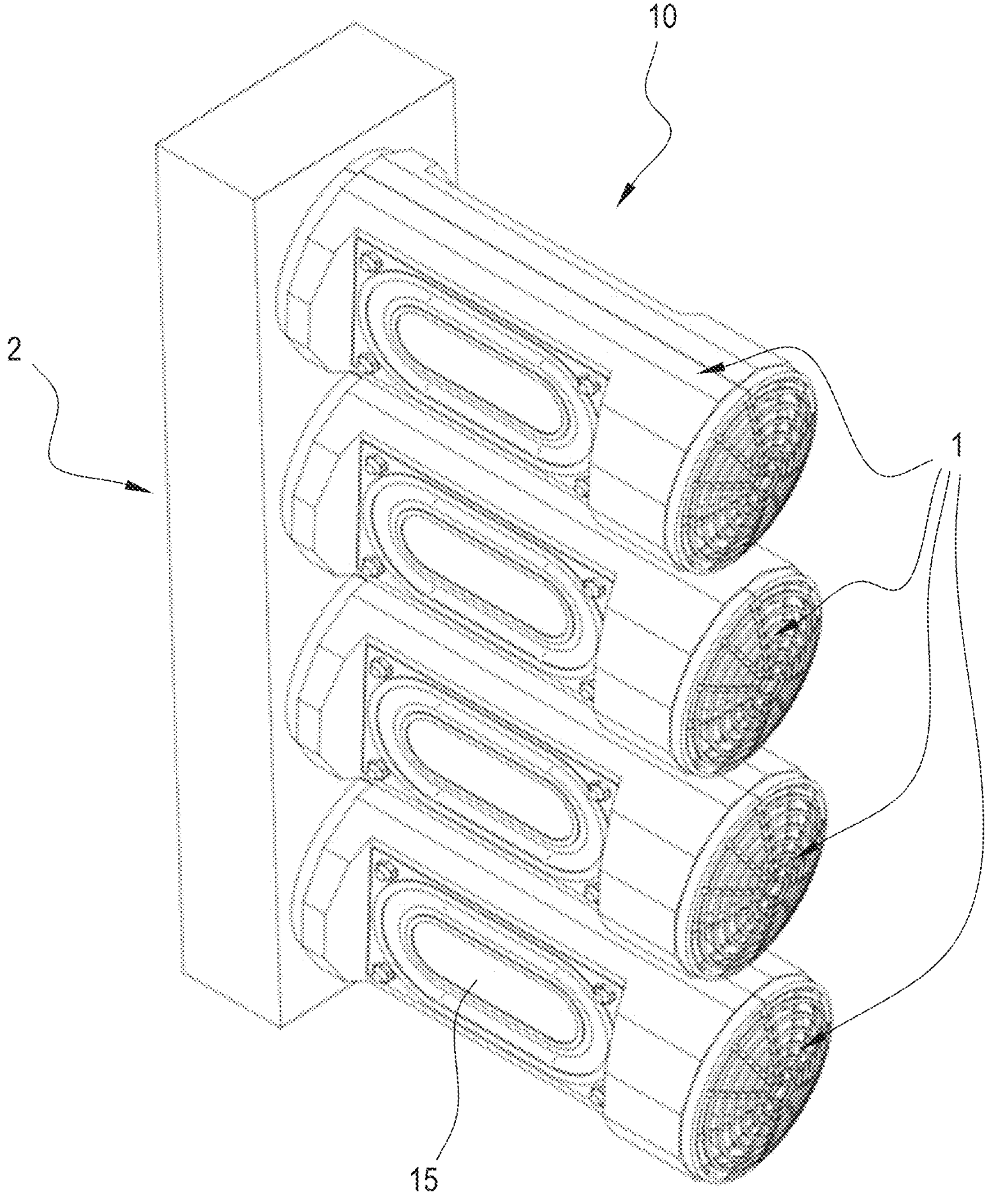
FIG. 3 illustrates a variant embodiment of the system of FIG. 1.
Figure 5A:
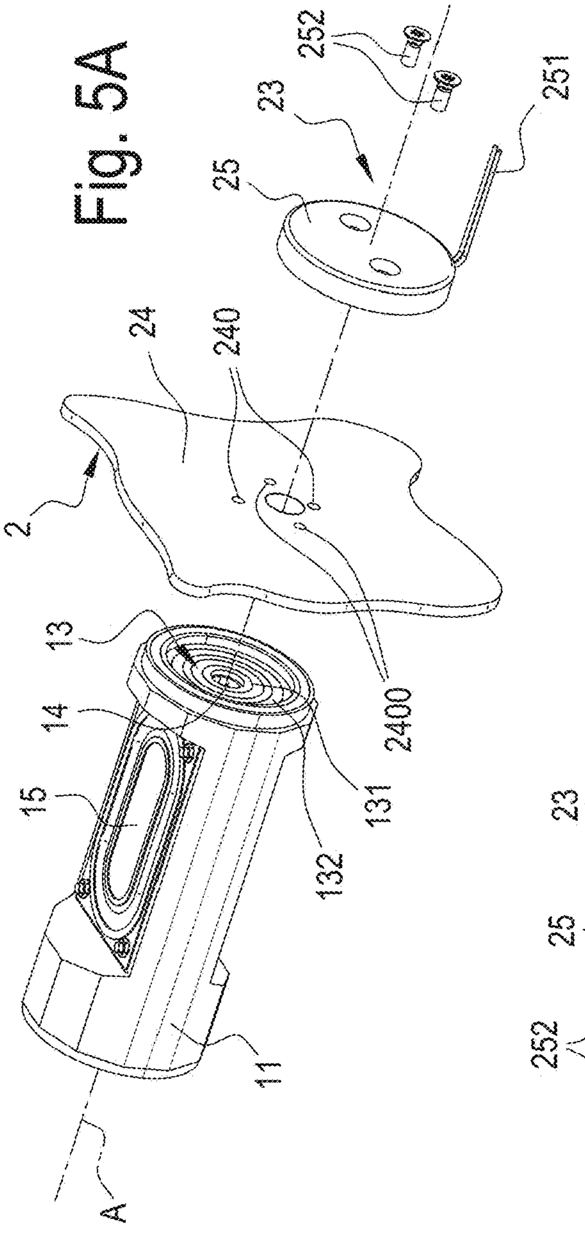
FIGS. 5A and 5B show a loudspeaker box and a portion of the supporting structure of the sound reproduction system of FIG. 1 or of FIG. 3 in respective exploded views from the front and from behind.
Figure 5B:
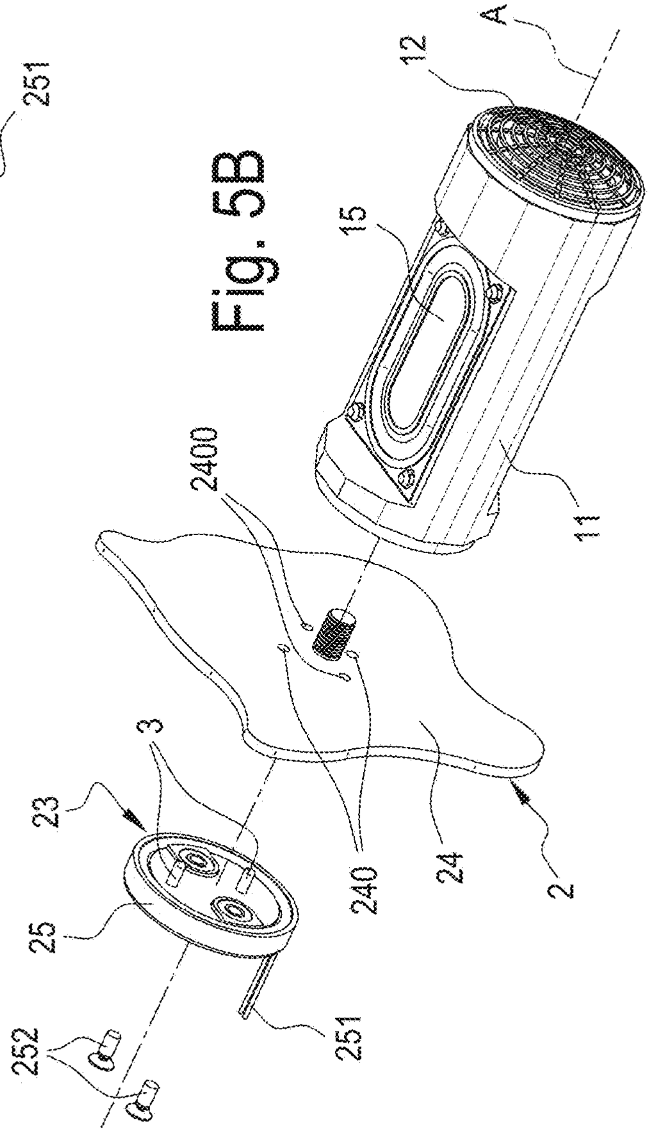
Figure 4:
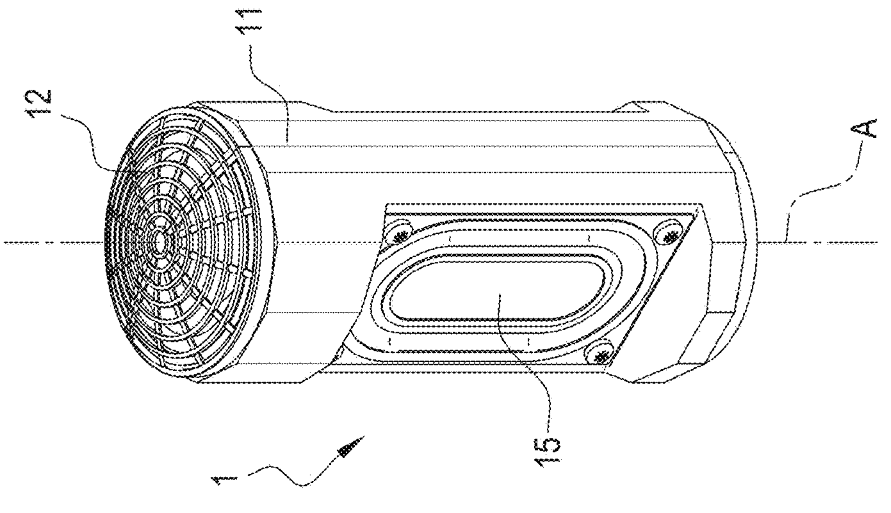
FIG. 4 shows a loudspeaker box of the sound reproduction system of FIG. 1 or of FIG. 3.
Figure 5C:
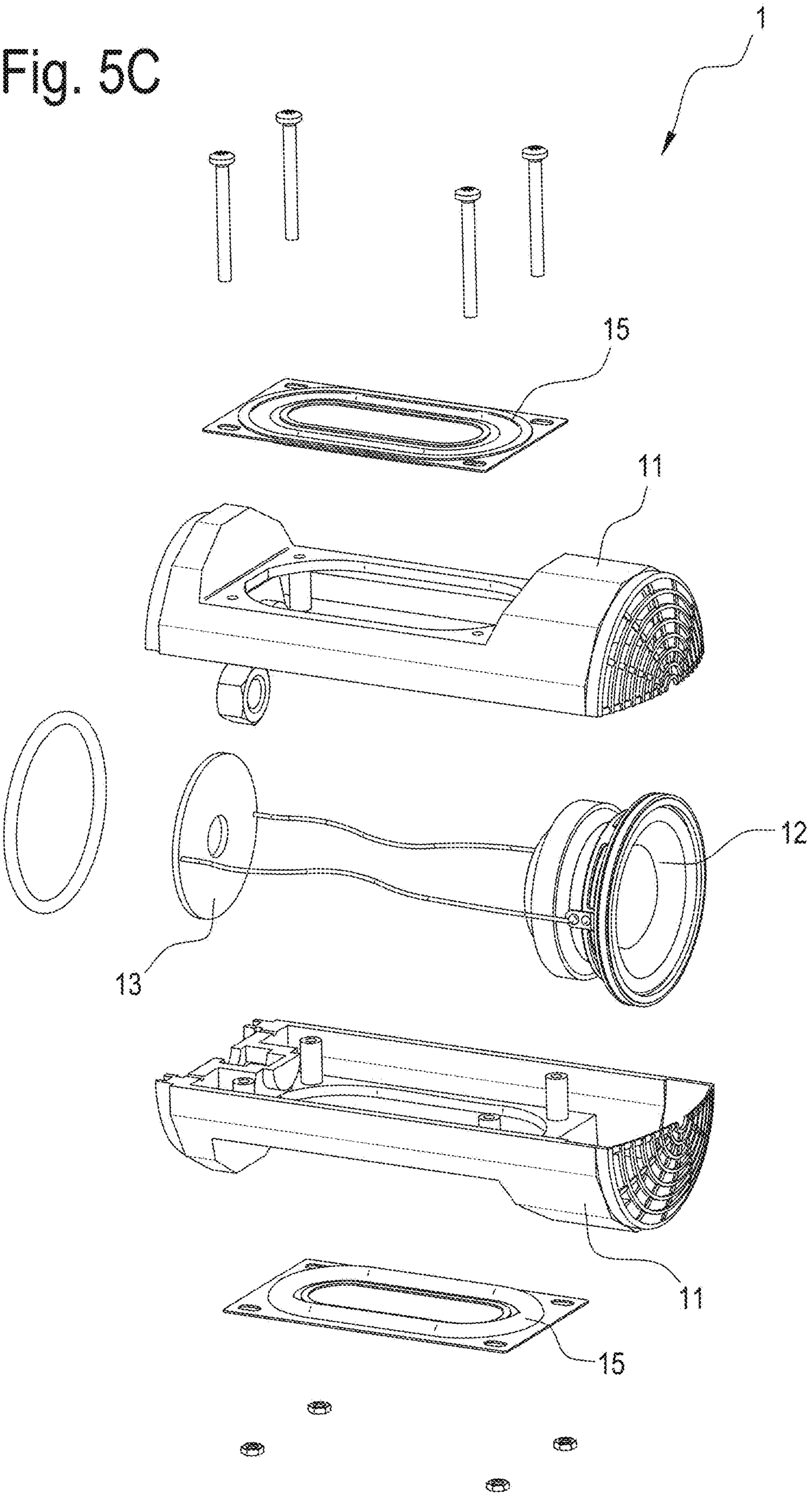
FIG. 5C shows the loudspeaker box of FIG. 4 in an exploded view.
Figure 6:
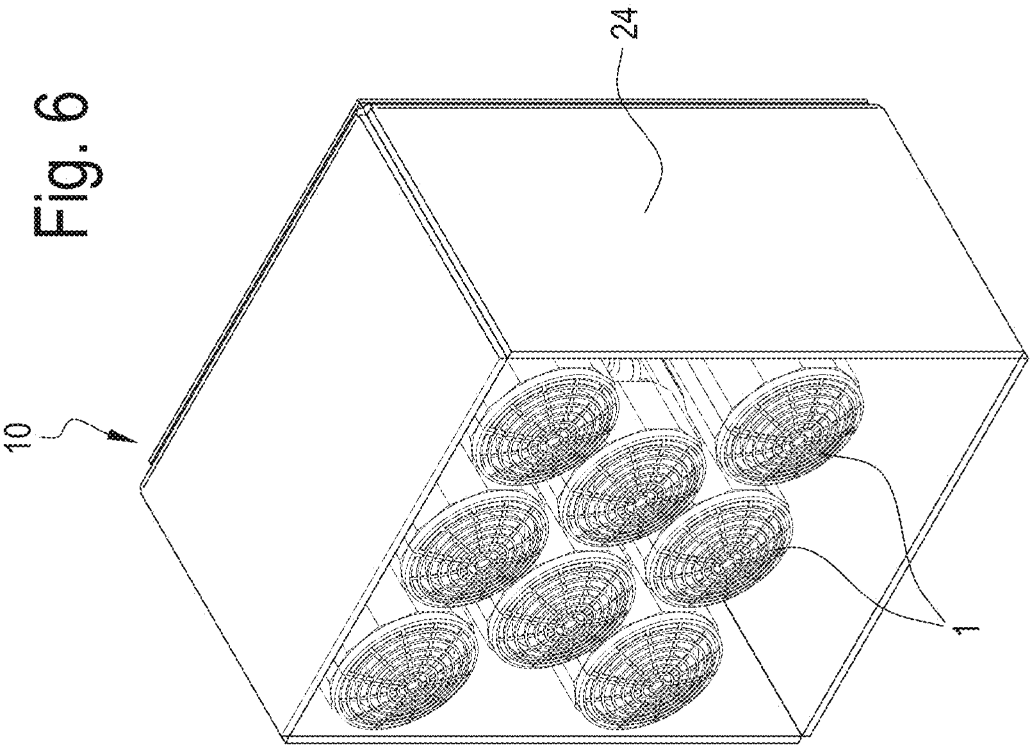
FIG. 6 shows a variant embodiment of the sound reproduction system of FIG. 1 in a side perspective view.
Figure 7:
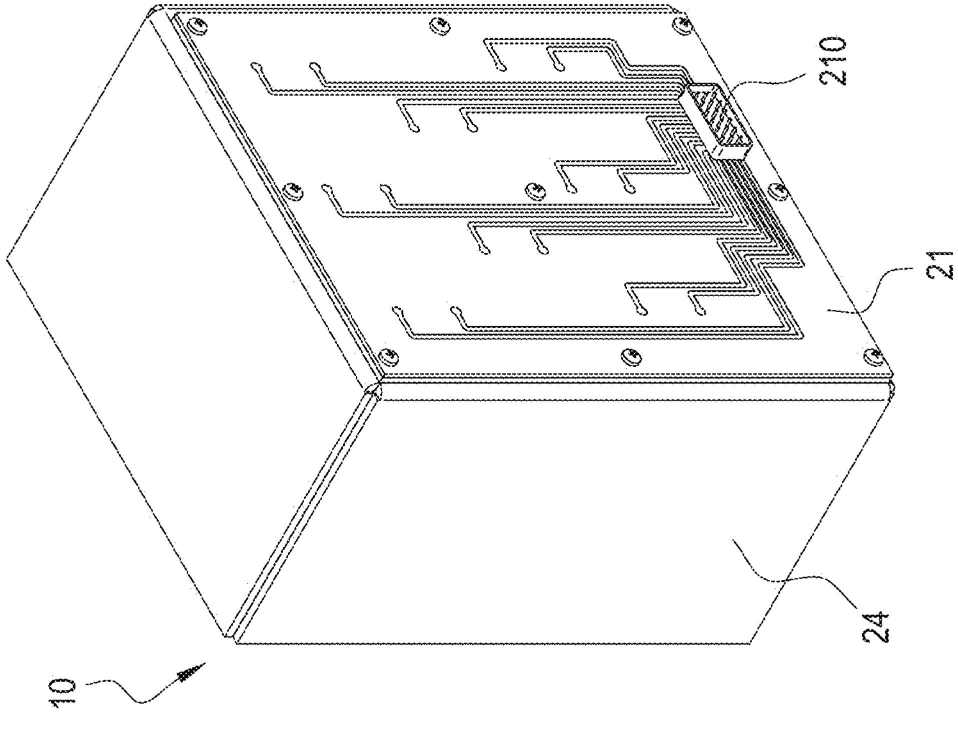
FIG. 7 shows the sound reproduction system of FIG. 6 in a perspective view from behind.
Figure 8:
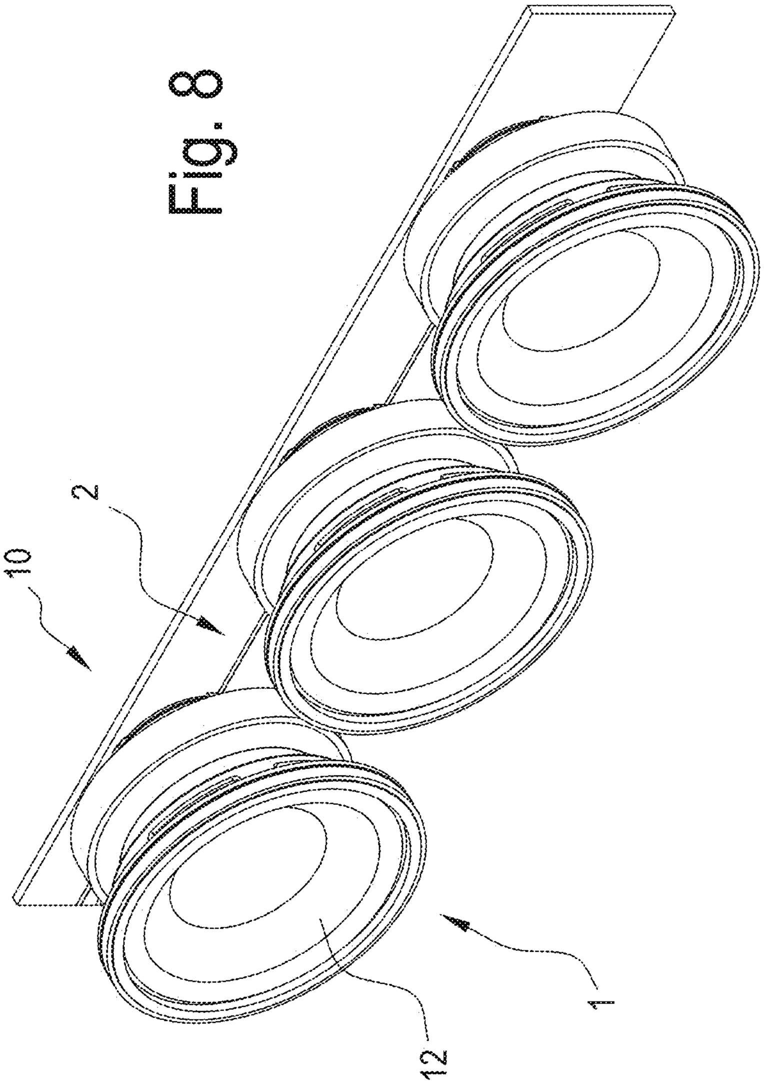
FIG. 8 shows a further variant embodiment of the sound reproduction system of FIG. 1 in a perspective view with the cabinet removed.
Figure 9:
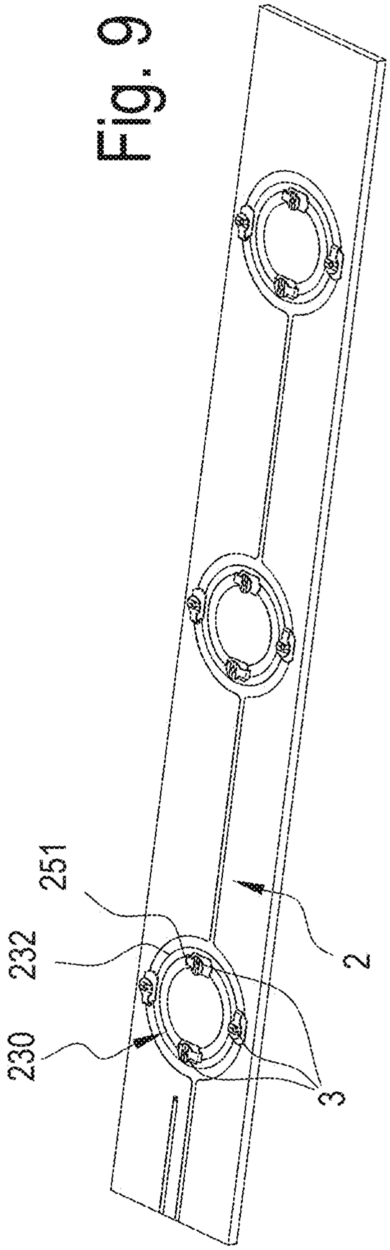
FIG. 9 shows the supporting structure of the sound reproduction system of FIG. 8 on which the deformable electrical connectors are applied.
Figure 11:
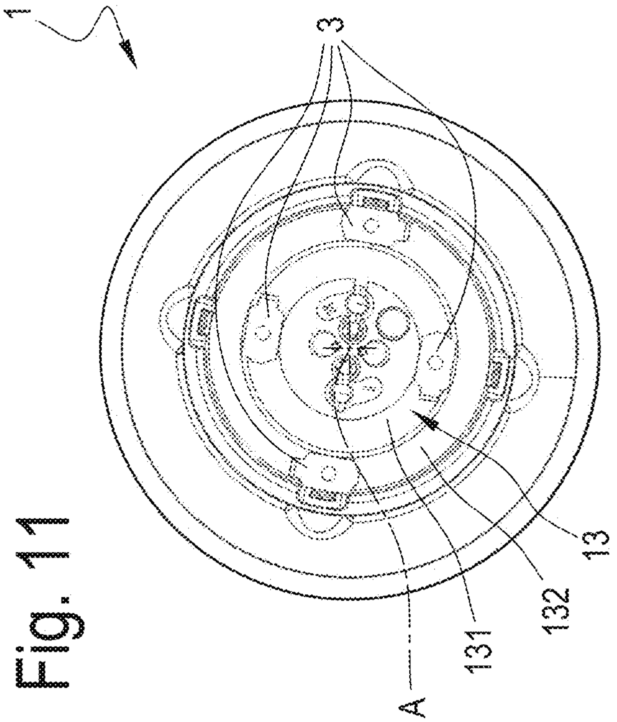
FIGS. 10 and 11 show a loudspeaker box of the sound reproduction system di FIG. 8.
Figure 10:
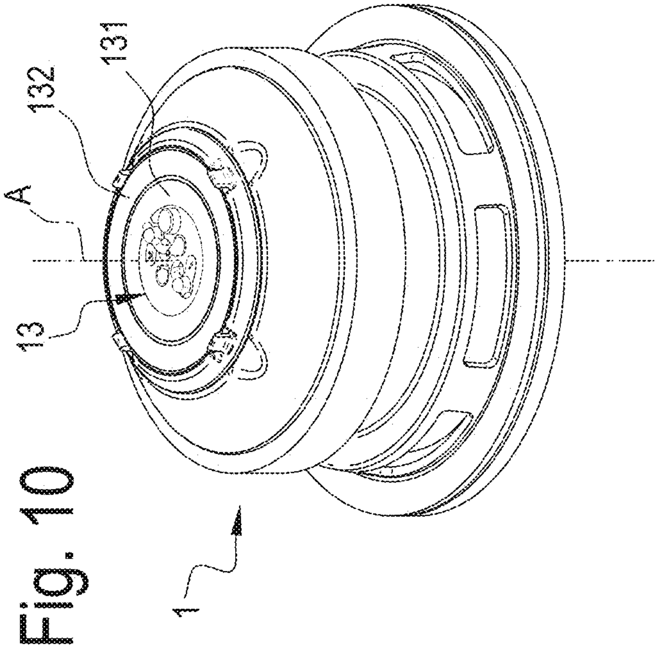
Figure 12:
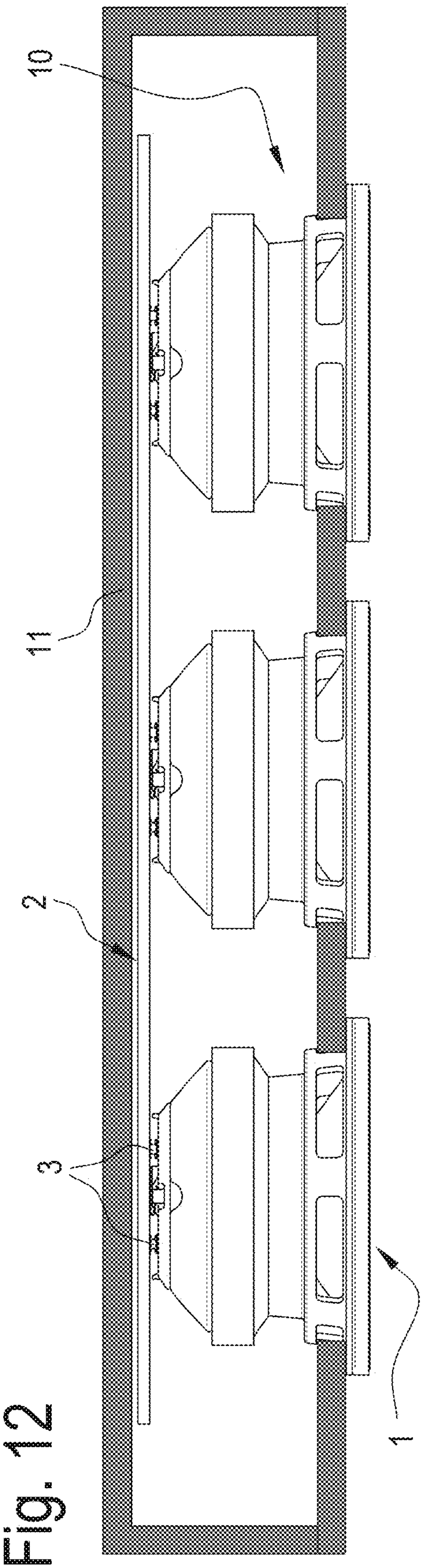
FIG. 12 shows another view of the sound reproduction system of FIG. 8, where the cabinet is also shown.
Figure 13:
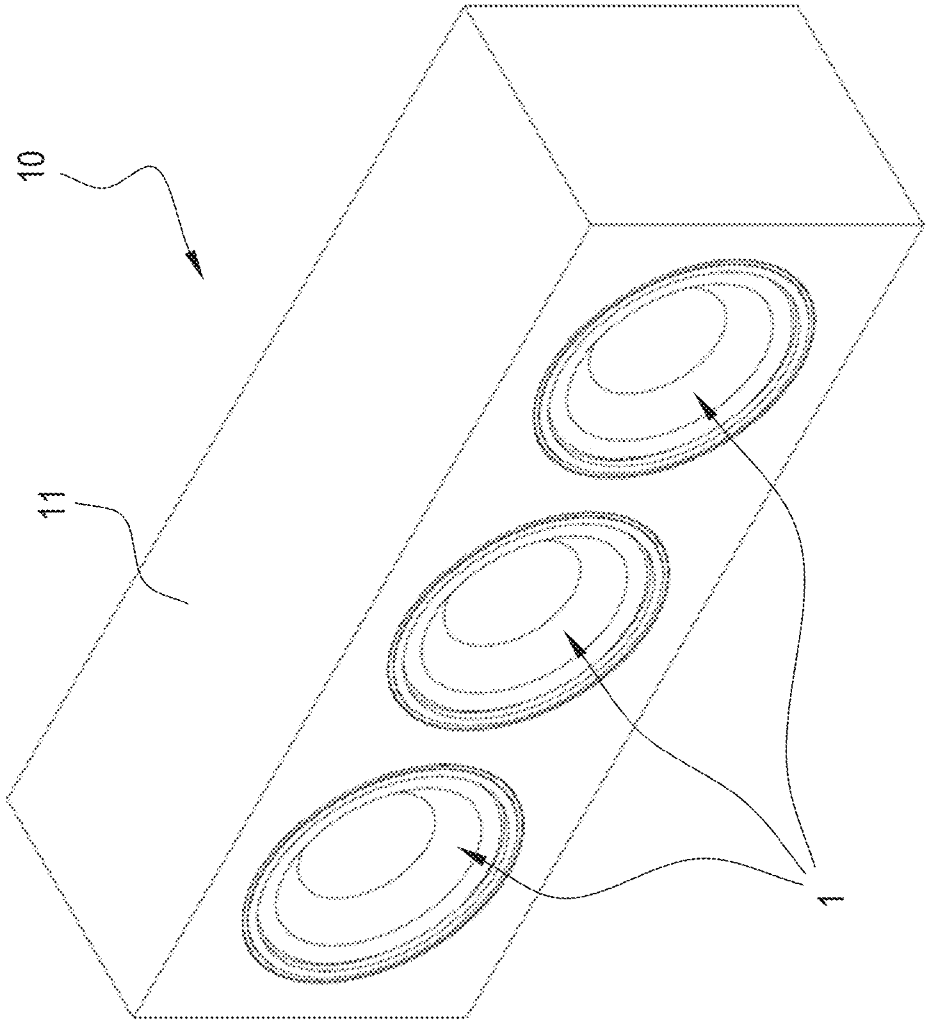
FIG. 13 shows another view of the sound reproduction system of FIG. 8, where the cabinet is also shown.

With reference to this disclosure, the numeral 1 denotes a loudspeaker box (i.e. a loudspeaker). The numeral 10 denotes a sound reproduction system, comprising a plurality of loudspeaker boxes 1. The plurality of loudspeaker boxes 1 may be disposed in a plane or in a line. The sound reproduction system 10 also comprises a supporting structure 2 to which the loudspeaker boxes 1 are removably connected.

The loudspeaker box 1 comprises a cabinet 11 which is functional to sound performance. Each loudspeaker box 1 includes a sound transducer 12 that includes a vibrating membrane.

The loudspeaker box extends between a first end and a second end, the first end and the second end being spaced along a longitudinal axis A. Hence, the loudspeaker box extends between the first end and the second end along the longitudinal axis. The sound transducer 12 is positioned at the first end of the loudspeaker box.

In an embodiment, the cabinet 11 extends around the longitudinal axis A. Thus, the cabinet 11 surrounds (or encloses or is associated with) a single loudspeaker box 1. More specifically, the cabinet 11 has the shape of a cylinder around the longitudinal axis A; alternatively, the cabinet 11 might have the shape of a parallelepiped (for example, with a square cross section) that is centred on the longitudinal axis A. In this embodiment, the sound transducer 12 is mounted on the cabinet 11. More specifically, the sound transducer 12 is mounted at a first longitudinal end of the cabinet 11.

In another embodiment, the cabinet 11 surrounds (or encloses or is associated with) a row or a matrix of loudspeaker boxes 1.

In an embodiment, the loudspeaker box 1 includes at least one passive resonator 15 (more specifically, a pair of passive resonators 15) including respective vibrating membranes mounted on the cabinet 11. The at least one passive resonator 15 is mounted along a side wall of the cabinet, between the first longitudinal end and a second longitudinal end, opposite the first along the longitudinal axis A.

The loudspeaker box 1 includes a connection circuit 13 configured to receive a signal and to transmit it to the sound transducer 12. The connection circuit 13 may be connected to the cabinet 11. The connection circuit 13 is positioned at the second end of the loudspeaker box. Hence, the sound transducer 12 and the connection circuit 13 are located at opposite ends of the loudspeaker box, with respect to the longitudinal axis A.

The connection circuit 13 comprises a first conductive track 131 and a second conductive track 132. The first conductive track 131 and the second conductive track 132 are planar and extend in a plane perpendicular to the longitudinal axis A. The first conductive track 131 and the second conductive track 132 are ring-shaped (that is, they have the shape of circular crowns) surrounding the longitudinal axis A. The second conductive track 132 surrounds the first conductive track 131.

The first and second conductive tracks 131, 132 are used to carry the signal to the loudspeaker box 1. The first conductive track 131 performs the function of positive (or negative) electrode and the second conductive track 132 performs the function of negative (or positive) electrode. In an embodiment, the first and second conductive tracks 131, 132 also carry the electrical power supply. In another embodiment, the first and second conductive tracks 131, 132 carry only the signal and there are two further, concentric conductive tracks (for example, surrounding the first and second conductive tracks 131, 132, or surrounded by the first and second conductive tracks 131, 132) to carry the electrical power supply.

For each loudspeaker box 1, the supporting structure 2 comprises a distribution circuit 23. The distribution circuit 23 is configured to transmit the signal (and preferably also the electrical power supply) to the connection circuit 13 of the respective loudspeaker box 1.

For each loudspeaker box 1, the sound reproduction system 10 also comprises electrical connectors 3, configured for electrically connecting the connection circuit 13 of the loudspeaker box 1 to the distribution circuit of the supporting structure 2.

The supporting structure 2 comprises a frame 24; more specifically, the frame 24 comprises a wall 241.

In an embodiment, each distribution circuit 23 includes a plate 25. The plate 25 comprises connector terminals 251 in the form of electrical cables, which carry the signal to the plate 25.

The plate 25 is mounted on a first side of the frame 24 (or wall 241), whilst the loudspeaker box 1 is mounted on a second side of the frame 24 (or wall 241), opposite the first side. The frame 24 (or the wall 241) is provided with holes 240, 2400.

The electrical connectors 3 are fixed to the plate 25, pass through the holes 240 and come into contact with the connection circuit 13 of the loudspeaker box 1. More specifically, at least a first connector 3 (positive electrode), which comes into contact with the first conductive track 131, and a second connector 3 (negative electrode), which comes into contact with the second conductive track 132, are provided. Thus, the first connector 3, which comes into contact with the first conductive track 131, is closer to the longitudinal axis A than the second connector, which comes into contact with the second conductive track 132.

Since the conductive tracks 131 and 132 extend around the longitudinal axis A, the electrical connectors 3 make contact whatever the angular position of the loudspeaker box 1 relative to the plate 25 around the longitudinal axis A.

In an embodiment, the supporting structure 2 comprises a plurality of mechanical connectors 242, which are fixed to the frame 24 (or wall 241). Each loudspeaker box 1 is removably mounted on a respective mechanical connector. More specifically, the mechanical connectors 242 are in the form of stud bolts; the loudspeaker box 1 has a central hole 14 that is surrounded by the first and the second conductive track 131 and 132; the central hole 14 defines a female screw that is removably connected to the stud bolt 242. The central hole 14 is aligned with the longitudinal axis A. The central hole 14 is located at the second end of the loudspeaker box.

Each plate 25 also has a plurality of mechanical connectors 252 (for example, screws) to fasten the plate 25 to the frame 24; the frame 24 (or wall 241) has a plurality of holes 2400 in which the mechanical connectors 252 are inserted.

In an embodiment, the supporting structure 2 comprises a printed distribution circuit 21 associated with the frame 24. The printed circuit 21 may in turn include electronic, amplifying, processing and control circuitry and the printed circuit 21 itself defines the distribution circuits 23 for the loudspeaker boxes 1. In this case, the electrical connectors 3 are fixed to the printed circuit 21 and connect the printed circuit 21 to the connection circuit 13. In this embodiment, the printed circuit 21 substantially performs the function of the plates 25 and of the connector terminals 251. In this embodiment, the supporting structure 2 also includes a common interface connector 210, configured to carry the signal to the printed circuit 21.

It should be noted that in the embodiment with the plates 25, each plate 25, hence each loudspeaker box 1, has its own respective connector terminals 251; in the embodiment with the printed circuit 21, on the other hand, there is a single terminal for powering the entire printed circuit 21, hence all the loudspeaker boxes 1 of the sound reproduction system 10.

In an embodiment, the distribution circuit 23 comprises a first conductive track 231 and a second conductive track 232. The second conductive track 232 and the first conductive track 231 extend along paths that surround the longitudinal axis A. More specifically, the second conductive track 232 surrounds the first conductive track 231. Preferably, the first conductive track 231 of the distribution circuit 23 has the shape of a ring (or circular crown) of the same size as the first conductive track 131 of the connection circuit 13. Similarly, the second conductive track 232 of the distribution circuit 23 has the shape of a ring (or circular crown) of the same size as the second conductive track 132 of the connection circuit 13. At least one flexible electrical connector 3 (or preferably a pair of flexible electrical connectors 3) is fixed to the first conductive track 231 to connect the first conductive track 231 of the distribution circuit 23 to the first conductive track 131 of the connection circuit 13. Similarly, at least one flexible electrical connector 3 (or preferably a pair of flexible electrical connectors 3) is fixed to the second conductive track 232 to connect the second conductive track 232 of the distribution circuit 23 to the second conductive track 132 of the connection circuit 13.

Since the conductive tracks 131 and 132 of the connection circuit 13 and the conductive tracks 231 and 232 of the distribution circuit 23 extend around the longitudinal axis A, the electrical connectors 3 create a contact between the distribution circuit 23 and the connection circuit 13 whatever the angular position of the loudspeaker box 1 relative to the distribution circuit 23 around the longitudinal axis A and whatever the angular position of the electrical connectors around the longitudinal axis A.

It should be noted that although, in a preferred embodiment, the conductive tracks 131 and 132 of the connection circuit 13 and the conductive tracks 231 and 232 of the distribution circuit 23 have the shape of unbroken rings surrounding the longitudinal axis A, the ring shapes of each of them surrounding the longitudinal axis A might, in another embodiment, not illustrated, include portions that are spaced apart. In this case, electrical contact between the connection circuit 13 of the loudspeaker box 1 and the distribution circuit 23 is made only at some of the relative angular positions.

What is claimed is:

1. A sound reproduction system, comprising:
- a supporting structure, including a distribution circuit;
- a loudspeaker box, removably connected mechanically to the supporting structure and including:
  - a cabinet;
  - a sound transducer, oriented along a longitudinal axis, positioned at a first end of the loudspeaker box and associated with the cabinet;
  - a connection circuit, positioned at a second end of the loudspeaker box, the second end being spaced from the first end along the longitudinal axis, the connection circuit being operatively connected electrically to the distribution circuit of the supporting structure and is configured to receive a signal from the distribution circuit and to transmit it to the sound transducer, wherein the connection circuit of the loudspeaker box is connectable to the distribution circuit of the supporting structure at a plurality of angular positions, rotated relative to each other about the longitudinal axis,
- and wherein at least one between the distribution circuit of the supporting structure and the connection circuit of the loudspeaker box includes a first conductive track and a second conductive track, which extend perpendicularly to the longitudinal axis and are distributed along respective concentric annular paths around the longitudinal axis.

2. The sound reproduction system according to claim 1, comprising a mechanical connector, wherein the loudspeaker box is mechanically connected to the supporting structure removably through the mechanical connector, and wherein the mechanical connector is positioned internally of the first conductive track and second conductive track.

3. The sound reproduction system according to claim 2, wherein the mechanical connector is threaded.

4. The sound reproduction system according to claim 3, wherein the mechanical connector is a stud bolt fastened to the supporting structure and extending along the longitudinal axis, and the loudspeaker box includes a removable female screw connected to the stud bolt.

5. The sound reproduction system according to claim 1, comprising a plurality of deformable electrical connectors, wherein the connection circuit of the loudspeaker box is electrically connected to the distribution circuit of the supporting structure through the deformable electrical connectors.

6. The sound reproduction system according to claim 5, wherein the first conductive track and the second conductive track are provided in the connection circuit of the loudspeaker box and wherein the distribution circuit of the supporting structure includes an additional first conductive track and an additional second conductive track, which extend perpendicularly to the longitudinal axis and are distributed along respective concentric annular paths around the longitudinal axis, wherein the plurality of the deformable electrical connectors includes at least a first deformable electrical connector which connects the first conductive track of the connection circuit of the loudspeaker box to the additional first conductive track of the distribution circuit of the supporting structure, and a second deformable electrical connector which connects the second conductive track of the connection circuit of the loudspeaker box to the additional second conductive track of the distribution circuit of the supporting structure.

7. The sound reproduction system according to claim 1, wherein the first conductive track and the second conductive track have the shape of uninterrupted concentric rings surrounding the longitudinal axis.

8. The sound reproduction system according to claim 1, wherein the cabinet encloses an internal space which is subject to pressure variations caused by the vibration of the sound transducer, and wherein the loudspeaker box comprises one or more passive resonators, including respective diaphragms that vibrate on account of the pressure variations in the internal space.

9. The sound reproduction system according to claim 1, comprising a plurality of loudspeaker boxes which are removably connected to the supporting structure, wherein the supporting structure includes a plurality of distribution circuits, and wherein each loudspeaker box of the plurality of loudspeaker boxes includes a respective connection circuit which is electrically connected to a respective distribution circuit of the plurality of distribution circuits.

10. The sound reproduction system according to claim 9, wherein the loudspeaker box includes an electronic printed circuit, configured to carry the signal to the plurality of distribution circuits.

11. The sound reproduction system according to claim 9, wherein the supporting structure includes a frame on which the plurality of loudspeaker boxes are mounted, wherein each distribution circuit of the plurality of distribution circuits includes a respective plate which is configured to receive the signal and to transmit it to the connection circuit of each loudspeaker box of the plurality of loudspeaker boxes, wherein the frame is interposed between each loudspeaker box of the plurality of loudspeaker boxes and the respective plate.

12. The sound reproduction system according to claim 11, comprising, for each loudspeaker box of the plurality of loudspeaker boxes, a respective plurality of electrical connectors, wherein the frame defines a plurality of holes in which the connectors of the plurality of electrical connectors are inserted in order to connect the connection circuit of the loudspeaker box to the respective plate.

13. The sound reproduction system according to claim 1, wherein the loudspeaker box is configured to be mechanically coupled to the supporting structure through a threaded coupling, by rotation around the longitudinal axis.

14. The sound reproduction system according to claim 1, wherein the loudspeaker box comprises a mechanical connector positioned at the second end of the loudspeaker box and aligned with the longitudinal axis.

15. A loudspeaker box, the loudspeaker box being removably connectable to a supporting structure including a distribution circuit and including:

a sound transducer, oriented along a longitudinal axis and positioned at a first end of the loudspeaker box and;

a connection circuit, positioned at a first end of the loudspeaker box, the second end being spaced from the first end along the longitudinal axis, the connection circuit being electrically connectable to the distribution circuit of the supporting structure and which is configured to receive a signal from the distribution circuit and to transmit it to the sound transducer, wherein the connection circuit includes a first conductive track and a second conductive track, which extend perpendicularly to the longitudinal axis and are distributed along respective concentric annular paths around the longitudinal axis.

16. The loudspeaker box of claim 15, comprising an operating structure, the sound transducer and the connection circuit being included in the operating structure, wherein the operating structure is provided with a rotationally symmetric with respect to the longitudinal axis.

17. A method for connecting a loudspeaker box to a supporting structure, wherein the supporting structure includes a distribution circuit and the loudspeaker box includes:

a sound transducer, oriented along a longitudinal axis and positioned at a first end of the loudspeaker box;

a connection circuit positioned at a first end of the loudspeaker box, the second end being opposite the first end with respect to the longitudinal axis, wherein the method comprises the following steps:

mounting the loudspeaker box on the supporting structure;

electrically connecting the connection circuit of the loudspeaker box to the distribution circuit of the supporting structure so that the connection circuit can receive a signal from the distribution circuit and can transmit it to the sound transducer, wherein the connection circuit of the loudspeaker box is connectable to the distribution circuit of the supporting structure at a plurality of angular positions, rotated relative to each other about the longitudinal axis, wherein at least one between the distribution circuit of the supporting structure and the connection circuit of the loudspeaker box includes a first conductive track and a second conductive track, which extend perpendicularly to the longitudinal axis and are distributed along respective concentric annular paths around the longitudinal axis.

18. The method according to claim 17, wherein the steps of mounting the loudspeaker box on the supporting structure and electrically connecting the connection circuit of the loudspeaker box to the distribution circuit of the supporting structure are carried out by moving the loudspeaker box towards the supporting structure along the longitudinal axis.

19. The method according to claim 18, wherein the steps of mounting the loudspeaker box on the supporting structure and electrically connecting the connection circuit of the loudspeaker box to the distribution circuit of the supporting structure are carried out by screwing the loudspeaker box to the supporting structure, by relative rotation around the longitudinal axis.

20. The method according to claim 17, wherein, during the steps of mounting the loudspeaker box on the supporting structure and electrically connecting the connection circuit of the loudspeaker box, the loudspeaker box remains oriented along the longitudinal axis.

* * * * *